United States Patent Office 3,639,429
Patented Feb. 1, 1972

3,639,429
PROCESS FOR OXIDIZING POLYFLUORINATED OLEFINES
Viktor Weinmayr, Landenberg, Pa., assignor to E. I. du Pont de Nemours and Company, Wilmington, Del.
No Drawing. Filed July 9, 1963, Ser. No. 293,899
Int. Cl. C07c 53/36, 51/38; C07d 1/06
U.S. Cl. 260—348.5 R
8 Claims This invention is directed to a novel process for preparing polyfluorinated epoxides, carbonyl fluoride and polyfluorinated acid fluorides. More particularly, this invention is directed to a novel process for obtaining polyfluorinated epoxides, carbonyl fluoride and polyfluorinated acid fluorides from polyfluorinated olefines.

There are a number of methods known for preparing polyfluorinated epoxides and polyfluorinated acid fluorides. For example, polyfluorinated epoxides have been prepared by treating polyfluorinated olefines with (a) oxygen under high pressure and temperature, (b) oxygen, halogens and actinic radiation or (c) alkaline hydrogen peroxide. However, these methods, in general, do not give very good yields.

Polyfluorinated acid fluorides have also been prepared by a number of methods, the most versatile of which is electrolysis of aliphatic carboxylic acid chlorides in liquid hydrogen fluoride. Although high yields of polyfluorinated acid fluorides may be obtained with acid chlorides of short chain length, longer chain acid chlorides usually give poorer yields and a number of by-products.

It is, therefore, an object of this invention to provide a novel process for converting polyfluorinated olefines to polyfluorinated epoxides.

It is a further object of this invention to provide a novel process for converting polyfluorinated olefines to polyfluorinated acid fluorides and carbonyl fluoride.

It is another object to provide a novel process for preparing polyfluorinated epoxides, polyfluorinated acid fluorides and carbonyl fluoride which does not require elevated pressures, halogens, actinic radiation or aqueous media.

It is still another object of this invention to provide a process which produces polyfluorinated epoxides, polyfluorinated acid fluoride and carbonyl fluoride in high yield.

These and other objects will become apparent from the following description and claims.

More specifically, the present invention is directed to a process for preparing compounds chosen from the group consisting of (a) 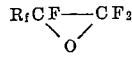

and (b) compounds having the formula $R_fCOF$ and $COF_2$, wherein $R_f$ is chosen from the group consisting of F—, $C_nF_{2n+1}$— and $H(CF_2)_n$— and wherein $n$ is an integer of from 1 to 18, which process comprises contacting a polyfluorinated olefine $R_fCF=CF_2$, wherein $R_f$ is defined as above, with a mixture consisting essentially of molecular oxygen and oxygen difluoride and recovering from the reaction mixture said compounds of group (a) and (b) defined above.

The present invention is also directed to the hereinbefore described process wherein the reaction temperature is from —35° to 120° C. and predominantly the compound

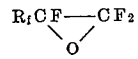

wherein $R_f$ is defined as above, is recovered from the reaction mixture.

The present invention is further directed to the process hereinbefore described wherein the reaction temperature is from 120° to 250° C. and predominantly the compounds of the group $R_fCOF$, wherein $R_f$ is defined as above, are recovered from the reaction mixture.

The present process consists of causing a polyfluorinated olefine $R_fCF=CF_2$ to react with oxygen in the presence of oxygen difluoride, $R_f$ being chosen from F—, $C_nF_{2n+1}$— and $H(CF_2)_n$— wherein $n$ is an integer from 1–18. Thus, the olefines which can be utilized in the present invention are tetrafluoroethylene, perfluoro-1-olefines containing from three to 20 carbon atoms and ω-hydroperfluoro-1-olefines containing from 3 to 20 carbon atoms. Representative examples of the perfluoro-1-olefines and ω-hydroperfluoro-1-olefines which can be utilized in this invention are hexafluoropropylene,
perfluorobutene-1,
perfluoropentene-1,
perfluorohexene-1,
perfluoroctene-1,
perfluorononene-1,
perfluorodecene-1,
perfluorohexadecene-1,
4H-perfluorobutene-1,
6H-perfluorohexene-1,
8H-perfluorooctene-1,
10H-perfluorodecene-1,
12H-perfluorododecene-1, and
18H-perfluorooctadecene-1.

The products prepared by this novel process are (a) 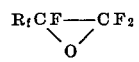

and (b) $R_fCOF$ and $COF_2$, wherein $R_f$ is chosen from the group F—, $C_nF_{2n+1}$ and $H(CF_2)_n$ and $n$ is an integer from 1–18. Usually both groups of products are produced, albeit one group may be in small amounts compared to the other group. The relative proportions of the products recovered from the present process vary with the reaction temperature as described further hereinbelow. It should be noted, however, that when the polyfluorinated olefines of this invention are oxidized to form compounds of group (b) above that the polyfluorinated olefine is cleaved to form equimolar amounts of $R_fCOF$ and $COF_2$, wherein $R_f$ is defined as above.

To be utilized in the present invention, the polyfluorinated olefines must contain the group —CF=CF$_2$. Generally internal polyfluorinated olefines such as $CF_3CF=CFCF_3$,
$(CF_3)_2C=CFCF_3$,
$CF_3CF_2CF=C(CF_3)_2$ and
$(CF_3)_2CFCF=C(CF_3)CF(CF_3)_2$ or polyfluorinated cyclic olefines such as perfluorocyclopentene or perfluorocyclohexene do not react according to the process of the present invention. It has been found, however, that small amounts of the internal olefines contained as impurities in larger amounts of terminal olefines will react.

In general, any mixture of molecular oxygen and oxygen difluoride may be used in this invention. It has been found that mixtures of these two gases containing as little as 0.001% by weight to as high as 90% by weight oxygen difluoride are useful. Oxygen difluoride is a catalyst in the reaction and is not consumed in the process. The extent of reaction is dependent then only on the amount of oxygen used. Unless the stiochiometric amount of oxygen is used, the conversion of polyfluorinated olefine cannot be complete. Since oxygen difluoride is not consumed, it must be either recovered or removed from the reaction product. It is preferred therefore to use only sufficient oxygen difluoride to give a convenient rate of reaction, generally 0.05% to 20% by weight. The relative amount of oxygen difluoride used seems to have no effect on the nature of the product obtained. Both oxygen and oxygen difluoride are required; either gas alone does not operate to produce the products of this invention.

It is not necessary to use pure oxygen difluoride in the present process. Commercial oxygen difluoride, which contains about 3% oxygen and 2% nitrogen, is especially useful. Also, oxygen difluoride prepared by electrolysis of dilute aqueous hydrogen fluoride [Engelbrecht, Monatsch, 90, 367 (1959)], which contains considerable oxygen, may be used. Similarly, oxygen diflolride prepared by reacting elemental fluorine with about 2% aqueous alkali hydroxide [Inorganic Synthesis, vol. I, 109, (1939)], which contains considerable oxygen, also may be used. Although it is not necessary, it is usually preferable to add further oxygen to these mixtures. It is preferred in this process to mix essentially pure oxygen with the oxygen difluoride although mixtures containing inert materials such as air may also be used. Nitrogen is inert but is undesirable because it is recovered with the oxygen difluoride and must eventually be removed from the reaction products.

Reaction temperatures are not a critical factor in this process. Temperatures as low as $-35°$ C. to as high as $250°$ C. are useful. Higher reaction temperatures tend to decompose the products. In general, temperatures of from $-20°$ C. to $220°$ C. are preferred. As might be expected, the rate of the reaction increases with temperature.

The reaction temperature, to some extent, controls the naure of the producs obtained. As a rule he relative amounts of acid fluoride $R_fCOF$ and carbonyl fluoride $COF_2$ increase with temperature. The epoxides

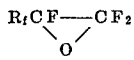

are usually the predominant products at reaction temperature below $120°$ C. while acid fluoride and carbonyl fluoride usually predominate above $120°$ C.

The present process may be carried out in either the vapor phase or the liquid phase. In the liquid phase, those olefines which are normally liquids may be used without solvent. Any useful olefine may also be used with a liquid solvent which is inert to oxygen and oxygen difluoride. Solid olefines require a solvent as a rule. Gaseous olefines such as tetrafluoroethylene, hexafluoropropylene, 3H-perfluoropropylene, perfluorobutene-1 and 4H-perfluorobutene-1 may be lead through the inert liquid. Inert liquid solvents which may be used include liquid saturated fluorocarbons, perfluorokerosine, nitrobenzene and saturated chlorofluoroalkanes such as 1,1,2-trichloro-1,2,2-trifluoroethane. Liuid hydrogen fluoride may also be used. Tetrafluoroethylene, because of its exceptional reactivity, requires the use of either an inert liquid or inert gaseous diluent for safe handling.

It is generally preferred to carry out the present process at near atmospheric pressure. Superatmospheric pressures may be used but offer no advantages and present possible hazards. In fully enclosed systems any carbonyl fluoride and other volatile products tend to dilute the entering oxygen so that the reaction rate may be decreased. It is generally desirable, therefore, to carry off such products with the unreacted oxygen and oxygen difluoride. Vapor phase reactions are preferably carried out in flow systems where the olefine, oxygen, oxygen difluoride and an inert diluent, if needed, are injected into a reaction zone and products are removed from the reaction zone. Good mixing of the reagents is required to obtain efficient reaction and good conversion.

The only effect of reaction time is on conversion. Long reaction times do not affect the yield of the products, since the products are stable to oxygen and oxygen difluoride except at extreme temperatures. Short reaction times give incomplete conversions. The preferred reaction times depend on the olefine being used, the reaction temperature and the characteristics of the reaction systems. The optimum reaction time is readily determined from reaction conditions by one skilled in the art. The presence of acids such as liquid hydrogen fluoride or bases (not including amines) does not affect the reaction although the acid fluoride products would be converted to salts of the corresponding bases in the latter case. As noted above, inert diluents such as nitrogen have no effect on the nature of the reaction products although the rate may be decreased. Of course, materials which are easily attacked by oxygen or oxygen difluoride should be excluded. Water is also generally undesirable but not fatal to the reaction.

Metals do not interfere with the present process, therefore any metal which is relatively inert to oxygen and oxygen difluoride and to the reaction products may be used as a material of construction for the present process. Steel, nickel and the nickel alloys such as stainless steel, "Inconel," and "Monel" are preferred. Copper is also useful. Glass equipment is also useful if hydrogen fluoride is absent.

The product of the present process consists of a mixture of polyfluorinated epoxides

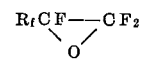

polyfluorinated acid fluorides $R_fCOF$, carbonyl fluoride, oxygen, oxygen difluoride and perhaps inert liluents and small amounts of unreacted polyfluorinated olefines. The oxygen and oxygen difluoride are easily removed by condensing the other materials using refrigerated condensers. The resulting gaseous mixture of oxygen and oxygen difluoride may be recycled if so desired. In a continuous process, oxygen difluoride is continuously recycled since it is not consumed and it is only necessary to add oxygen and polyfluorinated olefine to the feed stock. After removal of oxygen and oxygen difluoride the remainder of the reaction product is easily separated by fractional distillation. Pressure distillation may be required for the lower boiling materials. If carbonyl fluoride and polyfluorinated acid fluorides are not desired products, they may be removed by washing the reaction product with aqueous alkali.

Polyfluorinated epoxides are readily polymerized to useful polymers, such as by contacting the epoxides with alkali fluorides in inert organic solvents. The usefulness of such epoxides is further disclosed in French Pat. 1,262,-507 and British Pat. 904,877. Polyfluorinated acid fluorides $R_fCOF$ and their uses are well known in the art, for example, see U.S. Pat. 2,567,011. Carbonyl fluoride is well known in the art and is useful as an intermediate and as a fluorinating agent.

Representative examples illustrating the present invention are as follows. All parts are by weight unless otherwise specified.

EXAMPLE 1

Forty grams of 8H-pentadecafluoro-1-octene were placed in a 250 ml. flask fitted with a stirrer, gas inlet tube, thermometer well and reflux condenser. A mixture of oxygen and oxygen difluoride, containing 1.6 ml. of the latter per 1000 ml. of the former, was introduced into the reaction mass at 1500 ml./hr. for 4.5 hours at 115–120° C. The exit gas was passed through an aqueous solution of 5% potassium iodide to determine the amount of unreacted oxygen difluoride (oxygen difluoride reacts to form iodine). Within the limits of the analytical method, none of the oxygen difluoride was consumed.

The reaction mass was steam distilled from 5% aqueous sodium hydroxide solution giving 27 grams of liquid containing 87.8% by weight 1,2-epoxy-8H-pentadecafluorooctane and 12.2% by weight unreacted 8H-pentadecafluoro-1-octene, as determined by vapor phase chromatography. The yield of epoxide was 59.4%, based on the olefine charged (62.0% based on olefin consumed). No attempt was made to isolate and sodium 7H-dodecafluoroheptanoate from the alkaline steam distillation residue.

EXAMPLE 2

Forty grams of 8H-pentadecafluoro-1-octene were caused to react in the apparatus of Example 1, at 120° C., with 3690 ml. of a mixture of oxygen containing 8.6 ml. of oxygen difluoride per 1000 ml. of oxygen, over a period of 2 hours and 40 minutes. The exit gas was again analyzed and it was again found that no oxygen difluoride had been consumed. The reaction mass was washed with aqueous sodium hydroxide solution and dried. Analysis by vapor phase chromatography indicated that the conversion was 93.9%. Steam distillation of the product gave 1,2-epoxy-8H-pentadecafluorooctane in 94.2% purity and 68.3% yield, based on the olefine charged.

EXAMPLE 3

Three hundred and sixty-two grams of 8H-pentadecafluoro-1-octene (96% pure material) were charged into the reactor of Example 1 and heated to 116–120° C. A mixture of 20,000 ml. of oxygen and 3190 ml. of oxygen difluoride were passed into the reaction mass over a period of 25 hours. Conversion of the olefine was complete. Steam distillation from aqueous sodium hydroxide and fractionation of the steam distillate gave 195 grams of 1,2-epoxy-8H-pentadecafluorooctane, B.P. 117° C. (54% yield). The product showed the strong infrared adsorption at 5.6 microns due to fluorinated epoxides.

The alkaline residue of the steam distillation was extracted with 500 ml. of ethyl ether. Evaporation of the dried extract gave 25 grams of what appeared to be polymeric material.

The alkaline residue of the ether extraction was concentrated to 180 grams and 75 ml. of 96% sulfuric acid were added. An oil separated (75 grams) which was identified as 7H-dodecafluoroheptanoic acid (23.2% yield).

EXAMPLE 4

Forty-one grams of 8H-pentadecafluoro-1-octene were placed in the reaction system of Example 1. The reaction mass was heated at 120° C. and 2800 ml. of a mixture containing equal volumes of oxygen and oxygen difluoride were passed into the reaction mass over a four hour period. 1,2-epoxy-8H-pentadecafluorooctane was isolated in 92% yield. Again, no oxygen difluoride was consumed.

After one hour the exit gas from the reaction system, after passing through a condenser at −10° C., was collected. Analysis indicated that it contained 23% oxygen difluoride, 15% carbonyl fluoride, 4% trifluoroacetyl fluoride and 12% silicon tetrafluoride. Carbonyl fluoride resulted from oxidation of $H(CF_2)_6CF{=}CF_2$ while $CF_3COF$ resulted from oxidation of small amounts of $$H(CF_2)_5CF{=}CFCF_3$$

which were present in the starting material as in impurity. The epoxide from the internal olefine was not isolated.

EXAMPLE 5

Three hundred grams of 8H-pentadecafluoro-1-octene were placed in an "Inconel" reaction vessel and treated with a mixture of oxygen and oxygen difluoride at 18–21° C. for 15 hours. The oxygen difluoride was generated by passing 172 grams of undiluted fluorine at 0° C. into 400 ml. of 5% aqueous potassium hydroxide while continuously adding 40% aqueous potassium hydroxide to maintain the concentration of potassium hydroxide at 2–5%. The gas stream from this procedure contains 60% oxygen and 40% oxygen difluoride.

The reaction mass was purged at 20° C. with a stream of nitrogen, giving 260 grams (84% yield) of 1,2-epoxy-8H-pentadecafluorooctane. Conversion of olefine was complete. A small amount of acid fluoride was present. The pure epoxide was obtained by fractional distillation, B.P. 117° C. It was further identified by adding 5 drops of triethylamine to 5 ml. of the epoxide. After the initial strong reaction subsided, the mixture was heated to boiling and cooled. The product was identified as 8H-tetradecafluorooctanoyl fluoride [$H(CF_2)_7COF$] by its infrared spectra.

EXAMPLE 6

A solution of 41 grams of 8H-pentadecafluoro-1-octene in 80 grams of 1,1,2-trichloro-1,2,2-trifluoroethane was caused to react at 50° C. with 3900 ml. of gas consisting of equimolar amounts of oxygen and oxygen difluoride over a period of 5 hours. After removal of the solvent, the reaction mass was shown to consist of 85% 1,2-epoxy-8H-pentadecafluorooctane and 15% unreacted olefine by vapor phase chromatography. The exit gas from the reaction system was shown to consist of 30–35% oxygen difluoride, 15–17% carbonyl fluoride, 5–7% solvent, 4–5% silicon tetrafluoride and 4–8% trifluoroacetyl fluoride; the latter indicating that the small amount of 8H-pentadecafluoro-2-octene impurity in the starting material was also reacting with oxygen. The 2-octene was consumed during the early stages of the reaction.

EXAMPLE 7

A solution of 41 grams of 8H-pentadecafluoro-1-octene in 80 grams of 1,1,2-trichloro-1,2,2-trifluoroethane was caused to react at 20° C. with 4800 ml. of gas consisting of equimolar amounts of oxygen and oxygen difluoride over a 14 hour period. The exit gas consisted of approximately 30% oxygen difluoride, 15% carbonyl fluoride, 5% trifluoroacetyl fluoride, 5% silicon tetrafluoride and a trace of solvent, during the latter stages of the reaction. After removal of the solvent, the reaction mass consisted of 91.8% 1,2-epoxy-8H-pentadecafluorooctane (yield 45%) and 8.2% unreacted olefine.

EXAMPLE 8

Example 7 was repeated at −5° C. to 0° C. A total of 3200 ml. of gas was used over a 6 hour period. The reaction mass, after removal of solvent, consisted of 18.8% 1,2-epoxy-8H-pentadecafluorooctane and 81.2% unreacted olefine.

EXAMPLE 9

Oxygen (4400 ml.) was bubbled through 41 grams of 8H-pentadecafluoro-1-octene at 20° C. over a three hour period. The infrared spectrum of the exit gas showed no absorption; oxygen has none. The entire reaction mass was unreacted olefine.

This procedure was repeated at 120° C. using 2200 ml. of oxygen over a four hour period. Again, no reaction took place.

EXAMPLE 10

A solution of 40 grams of 1,2-epoxy-8H-pentadecafluorooctane in 80 grams of 1,1,2-trichloro-1,2,2-trifluoroethane was treated at 20° C. with 2500 ml. of gas containing equimolar amounts of oxygen and oxygen difluoride. The exit gas contained no oxidation products; the epoxide was recovered unchanged.

EXAMPLE 11

About 4500 ml. of a gas mixture containing 13 ml. of oxygen difluoride per 1000 ml. of oxygen were passed through a mixture of 40 grams of 8H-pentadecafluoro-1-octene, 40 grams of water and 4 grams of magnesium oxide, heated at 92° C., over a 3 hour period. Analysis of the water insoluble organic layer by vapor phase chromatography indicated that 30% of the 8H-pentadecafluoro-1-octene had been converted to 1,2-epoxy-8H-pentadecafluorooctane. The aqueous phase was still strongly alkaline.

EXAMPLE 12

A mixture of 41 grams of 8H-pentadecafluoro-1-octene and 0.02 gram of iodine, heated at 120° C., was treated with 1500 ml./hr. of a gas mixture containing 14 ml. oxygen difluoride per 1000 ml. oxygen, for two hours. The violent color of iodine disappeared after ten minutes. The exit gas contained oxygen difluoride. The reaction mass contained 86.7% 1,2 - epoxy - 8H - pentadecafluorooctane and 13.3% unreacted olefine. Then, 0.25 gram of finely divided potassium iodide was added to the reaction mass. The violet color of iodine appeared at once, indicating the presence of dissolved oxygen difluoride or of a peroxide or both. The same mixture of oxygen and oxygen difluoride as above was passed through the mixture for two hours. The reaction mass was then steam distilled from an alkaline medium, giving 25 grams of 95.2% pure 1,2-epoxy-8H-pentadecafluorooctane. From these results it was concluded that iodine did not interfere with the reaction.

EXAMPLE 13

Forty-one grams of 8H-pentadecafluoro-1-octene was heated under reflux (120° C.). A gas mixture containing 14 ml. oxygen difluoride per 1000 ml. of oxygen was passed through the liquid along with a stream of nitrous oxide. Over a three hour period, 3500 ml. of the oxygen mixture were used. The reaction mass consisted of 88.6% 1,2 - epoxy - 8H-pentadecafluorooctane and 11.4% unreacted olefine. Nitrous oxide did not interfere with the reaction.

EXAMPLE 14

About 3800 ml. of a gas mixture containing 13 ml. oxygen difluoride per 1000 ml. of oxygen were passed, over a 2.5 hour period, through 41 grams of 8H-pentadecafluoro-1-octene heated at 120° C. Simultaneously, a stream of nitrogen dioxide was passed through the liquid. The reaction mass contained 10.2% 1,2-epoxy-8H-pentadecafluorooctane. The flow of the oxygen-oxygen difluoride mixture was then continued for another 2.5 hours without the nitrogen dioxide. At the end of this time the reaction mass contained 96.2% 1,2-epoxy-8H-pentadecafluorooctane and 3.8% unreacted olefine. Nitrogen dioxide seems therefore to mildly interfere with the reaction.

EXAMPLE 15

About 10,000 ml. of a nitrogen mixture containing 63 ml. of commercial oxygen difluoride (containing 3% oxygen) per 1000 ml. of nitrogen were passed, over a 12 hour period, through 50 grams of 8H-pentadecafluoro-1-octene heated at 120° C. After steam distilling the reaction mass from 5% aqueous alkali, 44 grams of distillate were obtained. The distillate was unreacted olefine containing a trace of epoxide. A small amount (5 grams) of polymer of the starting olefine was obtained as steam distillation residue.

EXAMPLE 16

A gas mixture containing 40% oxygen difluoride and 60% oxygen was passed through 22 grams of 6H-undecafluoro-1-hexene (B.P. 75° C.) for ninety minutes at 9° to 45° C. The reaction mass contained 5H-octafluoropentanoyl fluoride and 1,2-epoxy-6H-undecafluorohexane.

EXAMPLE 17

A mixture of 5600 ml. of oxygen and 80 ml. oxygen difluoride was passed through 25 grams of perfluoro-1-heptene (B.P. 81° C.), heated at 80° C., over a four hour period. Steam distillation from 5% aqueous alkali gave 20 grams of distillate containing 75.6% 1,2-epoxyperfluoroheptane.

EXAMPLE 18

A countercurrent liquid-gas contactor reactor was fabricated from a 4 cm. I.D. x 60 cm. tube mounted in a vertical position and filled with 6 mm. diameter glass beads. A liquid inlet was provided above the beads and a liquid outlet below the beads. A gas inlet was provided below the beads and a gas outlet above the beads. Sufficient liquid was circulated to keep the bead surfaces wet. Oxygen, oxygen difluoride and tetrafluoroethylene were passed into the system via the gas inlet and "FC 101" (a fluorocarbon liquid sold by Minnesota Mining and Manufacturing Company) via the liquid inlet, both at approximately room temperature. The exit gas stream was analyzed periodically with the results shown below. Yields were calculated based on the amount of tetrafluoroethylene consumed.

| Time, hr. | $CF_2=CF_2$ flow, ml./min. | $O_2$ flow, ml./min. | $OF_2$ flow, ml./min. | Yield, percent $CF_2\diagdown O \diagup CF_2$ | Yield, percent $COF_2$ | Conversion, percent $CF_2=CF_2$ |
|---|---|---|---|---|---|---|
| 0.75 | 60 | 60 | 1.8 | 71 | 29 | 56 |
| 1.50 | 60 | 60 | 2.1 | 70 | 20 | 53 |
| 2.17 | 60 | 60 | 2.4 | 69 | 31 | 64 |
| 3.17 | 60 | 60 | 2.4 | 81 | 19 | 87 |
| 4.00 | 60 | 60 | 1.8 | 64 | 36 | 61 |
| 6.00 | 60 | 60 | 2.4 | 72 | 28 | 64 |
| 6.67 | 60 | 60 | 2.4 | 73 | 27 | 66 |

When no oxygen difluoride was present, no reaction took place. When the reaction temperature was increased, the yield of carbonyl fluoride increased. When the descending liquid was omitted and the glass heads were replaced with metal helices, carbonyl fluoride was obtained in 97.6% yield and 91% conversion. Under these conditions, the heat of reaction increases the temperature of the reaction zone markedly.

EXAMPLE 19

It was shown in Example 19 that omission of the liquid diluent caused the temperature to rise markedly. The reaction using tetrafluoroethylene becomes difficult to control without the diluent, resulting in the formation of carbon tetrafluoride and light, and is often accompanied by small explosions. It has been found, however, that proper control is easily maintained if some of the carbonyl fluoride reaction product is recycled with the tetrafluoroethylene feedstock. A suitable reaction system consisted of a 6 mm. I.D. flow reactor of thinwall stainless steel tubing surrounded by a steam jacket. A 3 mm. O.D. pencil type thermocouple was inserted into the outlet end of the reactor for a distance of 178 mm. within the steam jacket. A 3 mm. O.D. piece of thinwall stainless steel tubing was inserted at the inlet end of the reactor for a distance of 178 mm. within the steam jacket. The total length of the steam jacket was 1372 mm. A mixture of 50 ml./min. oxygen and 1.2 ml./min. oxygen difluoride was fed into the reaction zone via the inner 3 mm. tubing. A mixture of 50 ml./min. tetrafluoroethylene and 300 ml./min. recycle product was fed into the reactor via the annular space around the 3 mm. tubing. The reaction temperature was maintained at 170–190° C. The conversion of tetrafluoroethylene was 91%, the yield of carbonyl fluoride was 99.1%. An approximately 0.8% yield of carbon tetrafluoride and 0.1% yield of tetrafluoroethylene epoxide were also obtained.

It is understood that the preceding examples are representative and that said examples may be varied within the scope of the total specification, as understood by one skilled in the art, to produce essentially the same result.

As many apparently widely different embodiments of this invention may be made without departing from the The embodiments of the invention in which an exclusive property or privilege is claimed are defined as follows:

1. A process for preparing predominantly $COF_2$ which process comprises contacting in a reaction zone and at a temperature range from 170° C. to 190° C. the compound $CF_2=CF_2$ with a mixture consisting essentially of molecular oxygen and oxygen difluoride, said mixture having a ratio of approximately 24 volumes of oxygen difluoride per 1000 volumes of molecular oxygen, wherein part of the product $COF_2$ is recycled and mixed with said $CF_2=CF_2$ prior to the entry of said $CF_2=CF_2$ into said reaction zone; and recovering the product $COF_2$ from the reaction mixture.

2. A process for preparing predominantly the compound

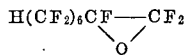

which process comprises contacting at a temperature range from 50° C. to 120° C. the compound $$H(CF_2)_6CF_2=CH_2$$

with a mixture consisting essentially of molecular oxygen and oxygen difluoride, said mixture having an oxygen difluoride concentration of from 1.6 to 670 volumes of oxygen difluoride per 1000 volumes of molecular oxygen; and recovering the product

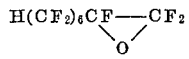

from the reaction mixture.

3. A process which comprises contacting a polyfluorinated olefine $R_fCF=CF_2$ with a mixture consisting essentially of molecular oxygen and oxygen difluoride wherein from 0.001% to 90% by weight of said mixture is oxygen difluoride, wherein $R_f$ is chosen from the group consisting of F—, $C_nF_{2n+1}$—, and $H(CF_2)_n$—, and $n$ is an integer of from 1 to 18, and recovering the products from the reaction mixture.

4. A process which comprises contacting at a temperature of from about —35° C. to about 250° C. a polyfluorinated olefine $R_fCF=CF_2$, wherein $R_f$ is chosen from the group consisting of F—, $C_nF_{2n+1}$—, and $H(CF_2)_n$—, and $n$ is an integer of from 1 to 18, with a mixture consisting essentially of molecular oxygen and oxygen difluoride, wherein said mixture contains from 0.001% to 90% by weight oxygen difluoride, and recovering the products from the reaction mixture.

5. A process which comprises contacting at a temperature of from about —35° C. to about 250° C. a polyfluorinated olefine $R_fCF=CF_2$, wherein $R_f$ is chosen from the group consisting of F—, $C_nF_{2n+1}$—, and $H(CF_2)_n$—, and $n$ is an integer of from 1 to 18 with a mixture consisting essentially of molecular oxygen and oxygen difluoride, wherein said mixture contains from 0.05% to 20% by weight oxygen difluoride, and recovering the products from the reaction mixture.

6. A process which comprises contacting at a temperature of from about —35° C. to 120° C. a polyfluorinated olefine $R_1CF=CF_2$, wherein $R_f$ is chosen from the group consisting of F—, $C_nF_{2n+1}$—, and $H(CF_2)_n$—, and $n$ is an integer of from 1 to 18, with a mixture consisting essentially of molecular oxygen and oxygen difluoride wherein from 0.001% to 90% by weight of said mixture is oxygen difluoride, and recovering from the reaction mixture the product

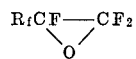

wherein $R_f$ is defined as above.

7. A process which comprises contacting at a temperature of from about 120° C. to 250° C. a polyfluorinated olefine $R_fCF=CF_2$, wherein $R_f$ is chosen from the group consisting of F, $C_nF_{2n+1}$—, and $H(CF_2)_n$—, and $n$ is an integer of from 1 to 18, with a mixture consisting essentially of molecular oxygen and oxygen difluoride wherein from 0.001% to 90% by weight of said mixture is oxygen difluoride, and recovering the products from the reaction mixture.

8. A process which comprises contacting at a temperature of from about 120° C. to 250° C. the compound $CF_2=CF_2$ with a mixture consisting essentially of molecular oxygen and oxygen difluoride wherein from 0.001% to 90% by weight of said mixture is oxygen difluoride, and recovering the product $COF_2$ from the reaction mixture.

References Cited

UNITED STATES PATENTS

| 2,549,892 | 4/1951 | Chaney | 260—348 |
| 2,968,145 | 1/1961 | Kanarek | 60—35.4 |

FOREIGN PATENTS

| 947,364 | 8/1956 | Germany. |

OTHER REFERENCES

Remy: Treatise on Inorganic Chemistry, vol. I (1956), pp. 800–1.

Leonard, A. S.; Chem. Abstracts, vol. 42, p. 4727 (1948).

NORMA S. MILESTONE, Primary Examiner

U.S. Cl. X.R.

260—348.5 V, 544 F, 348 R